Figure 1:
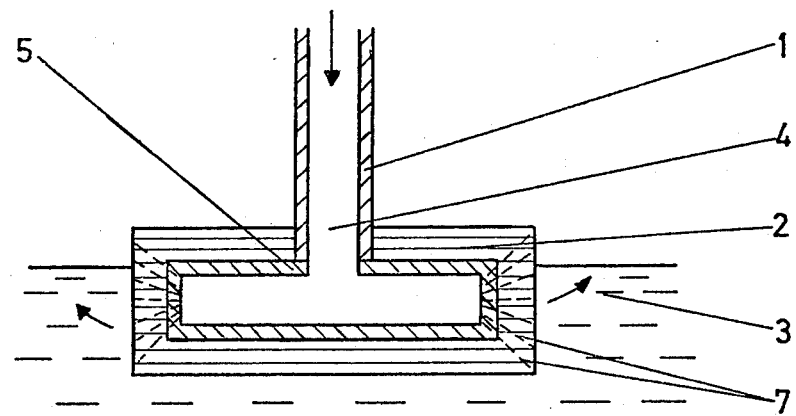

United States Patent [19]
Alder

[11] 3,974,046
[45] Aug. 10, 1976

[54] PROCESS FOR THE ELECTROLYSIS OF A MOLTEN CHARGE USING INCONSUMABLE ANODES

[75] Inventor: Hanspeter Alder, Flurlingen, Switzerland

[73] Assignee: Swiss Aluminium Ltd., Neuhausen am Rheinfall, Switzerland

[22] Filed: Sept. 30, 1974

[21] Appl. No.: 510,303

[30] Foreign Application Priority Data
Oct. 16, 1973   Switzerland...................... 14609/73

[52] U.S. Cl. ................................ 204/67; 204/246; 204/284
[51] Int. Cl.² ..................... C25C 3/06; C25C 3/12
[58] Field of Search ............... 204/39, 60–71, 204/246, 284, 290 R, 291, 243 R

[56] References Cited
UNITED STATES PATENTS

| | | |
|---|---|---|
| 3,560,353 | 2/1971 | Svadlenak............................. 204/68 |
| 3,696,008 | 10/1972 | Levitan................................ 204/67 |
| 3,718,550 | 2/1973 | Klein.................................... 204/67 |

*Primary Examiner*—John H. Mack
*Assistant Examiner*—Aaron Weisstuch
*Attorney, Agent, or Firm*—Ernest F. Marmorek

[57] ABSTRACT

A process for the electrolysis of a molten charge in particular of aluminum oxide, in a cell which is fitted with one or more anodes whose working surfaces are of ceramic oxide material. The parts of the anode surface which are not protected from corrosive attack by means of a sufficiently high current density are subjected to a stream of oxidizing gas.

10 Claims, 2 Drawing Figures

PROCESS FOR THE ELECTROLYSIS OF A MOLTEN CHARGE USING INCONSUMABLE ANODES

Reference is had to applicant's co-pending patent applications Ser. No. 470,198, filed May 15, 1974 and Ser. No. 529,754, filed Dec. 5, 1974.

The invention relates to a process for the electrolysis of a molten charge, in particular one of aluminum oxide, using inconsumable anodes which are at least in part protected by an oxidising gas.

In the electrolytic production of aluminum by the Hall-Heroult process, a cryolite melt with $Al_2O_3$ dissolved in it is electrolysed at 940° – 1000°C. The aluminum which separates out in the process, collects on the cathodic carbon floor of the electrolysis cell whilst $CO_2$ and to a small extent CO are formed at the carbon anode. The anode is thereby burnt away.

The reaction:

$$Al_2O_3 + 3/2\ C \rightarrow 2\ Al + 3/2\ CO_2 \qquad 1.$$

consumes theoretically 0.334 kg C/kg Al; in practice however up to 0.5 kg C/kg Al is consumed.

There are various disadvantages with anodes which are combustible:

In order to obtain aluminum of acceptable purity a pure coke with low ash content must be used as anode carbon.

Because the carbon anode is burnt away it has to be advanced from time to time in order to maintain the optimum inter-polar distance between the anode surface and the surface of the aluminum. Periodically the pre-baked anodes have to be replaced by new ones and continuous anodes (Soderberg-anodes) have to be recharged.

In the case of pre-baked anodes, a separate manufacturing plant, the anode plant, is necessary.

It is obvious that this process is laborious and expensive. The direct decomposition of $Al_2O_3$ to its elements, viz., $$Al_2O_3 \rightarrow 2\ Al + 3/2\ O_2$$

using an anode where no reaction with oxygen takes place, is therefore of greater interest.

Using this method, the above mentioned disadvantages of the carbon anodes disappear. Furthermore, oxygen, which can be re-used industrially, is released as a by-product. The inconsumable anode is particularly suitable for a sealed furnace where the waste gases, which consist mainly of oxygen, can be easily collected and purified. This furnace can be automated and controlled from outside, leading therefore to improved working conditions and a reduction of problems related to the pollution of the environment.

The demands which are made on an inconsumable anode are very high. As is described in detail in the U.S. patent application Ser. No. 470,198, filed May 15, 1974, they must for instance, be insoluble in the melt and be corrosion resistant at an operating temperature of 1000°C as well as having a good electrical conductivity.

As the basic material which can be used for the anode surface coming into contact with the corrosive charge, oxides above all come into consideration, for example oxides of tin, iron, chromium, cobalt, nickel or zinc.

Mostly these oxides can not be densely sintered without additives and furthermore, exhibit a relatively high specific resisivity at 1000°C. Additions of a least one other metal oxide in a concentration of 0.01 – 20 weight %, preferably 0.05 – 2 % have to be made therefore in order to improve on the properties of the pure oxide. Oxides of the following metals which can be used either individually or in combinations, have been shown to be useful additives to increase the sinterability, the density and the conductivity:

Mn, Fe, Sb, Cu, Nb, Zn, Cr, Co, W, Cd, Zr, Ta, In, Ni, Ca, Ba, Bi.

Processes which are well known in the technology of ceramics can be used for the production of ceramic oxide items of this kind. The oxide mixture is ground, shaped as desired by extruding or casting as a slurry and sintered at a high temperature.

The oxide mixture can also be applied by cold or hot extrusion, plasma or flame spraying, explosive coating, physical or chemical precipitation from the gas phase or by another known method, in the form of a coating on a substrate which can serve as a current distributor, and the coating can then if necessary be sintered. The bonding to the substrate is improved if before coating the surface of the substrate is roughened mechanically or chemically or if a wire mesh is welded onto it.

The ceramic oxide anode can have any desired shape but the plate or cylindrical shape is preferred.

Anodes of this kind have the following advantages:
high resistance to damage due to temperature changes
low solubility in the molten charge at high temperature
small specific resistivity
resistant to oxidation
negligible porosity.

The molten electrolyte can, as is normal in practice, consist of fluorides, above all cryolite, or of a mixture of oxides as can be found in technical literature on this subject.

For application in the electrolysis of aluminum the ceramic anode must on the one hand be in contact with the molten charge and on the other hand with an electrical power supply. The discharging of the $O^{2-}$ ions takes place at the interface between the melt and the ceramic oxide, and the gaseous oxygen formed escapes through the melt.

It has been found with the aid of trials that when a ceramic body of tin oxide, for example a cylinder, is immersed in the molten charge without carrying an electrical current a rapid removal of tin oxide occurs. Since experience has shown that tin oxide is resistant to pure cryolite, the reaction with dissolved and suspended aluminum in the cryolite appears to be important:

$$3\ SnO_2 + 4\ Al \rightarrow 3\ Sn + 2\ Al_2O_3 \qquad 3.$$

A similar behaviour is found when using other electrolytes which consist of compounds other than cryolite but which also contain aluminum.

If the anode surface in contact with the molten electrolyte bears an electric current then the rate of corrosion is markedly lowered, and reduced to practically zero if the current density at all places exceeds a certain minimum value. This minimum current density must, as described in the U.S. patent application No. 470,198, filed May 15, 1974, amount to 0.001 A/cm$^2$, however to advantage at least 0.01 A/cm$^2$, in particular at least 0.025 A/cm$^2$ is used.

In practice however it has been shown that under certain circumstances it can be difficult to achieve a uniform current density over the whole of the anode surface in contact with the electrolyte, because this current distribution is not only dependent on the conductivity of the ceramic and the melt but also on the geometry of the cell, the local conditions of flow, the bath temperature and other factors. The current density over the whole of the immersed anode surface can not only be non-uniform but in certain circumstances can fail to reach the minimum value in some places resulting in the corrosion reaction (3) taking place in these areas.

The object of the present invention is to develop a process for the electrolysis of a molten charge, in particular one of aluminum oxide, in a cell which is fitted with one or more anodes with working surfaces of ceramic oxide material, whereby the whole of the anode surface area immersed in the melt is protected. The above mentioned difficulties can then not arise and corrosion of the anode is completely prevented.

The object is fulfilled in terms of the invention in that at least those parts of the anode surface which are not protected by an adequate current density have an oxidising gas blown on to them.

For this purpose the anode is provided with a system of pores and/or channels which permit the gas supplied to reach at least to a part of the anode surface.

The oxidising gases can consist of the following gases either individually or combined:

oxygen, air, chlorine, fluorine, carbon dioxide, nitrogen oxide.

The gas arrives at the appropriate areas through pores or channels in the ceramic oxide surface of the anode and passes into the melt.

The minimum gas through-put amounts to 0.01 m mol/(cm$^2$h), however to advantage at least 0.1 m mol/(cm$^2$h) is used, in particular at least 0.2 m mol/(cm$^2$h) of oxidising gas.

The pores in the anode of the invention are produced either by adding no sintering agent to the basic material or by choosing the sintering time and temperature so that the final structure is not impervious. Furthermore, additives can be introduced before sintering and are of such a kind that they vaporise during sintering or can be chemically dissolved out of the ceramic structure afterwards.

It is also possible to provide the anode with channels which are bored out either before or after sintering.

In the accompanying diagrams, various embodiments of the ceramic oxide anode of the invention are shown immersed in a molten electrolyte and are presented herein vertical cross section. This assumes that the cathode runs parallel to the bottom of the anode and that the current flows entirely out of the bottom of the anode.

FIG. 1 Shows an anode with a porous structure in its sidewall region. Protection of the areas carrying no current is afforded by the supply of oxidising gas from outside.

Figure 2:
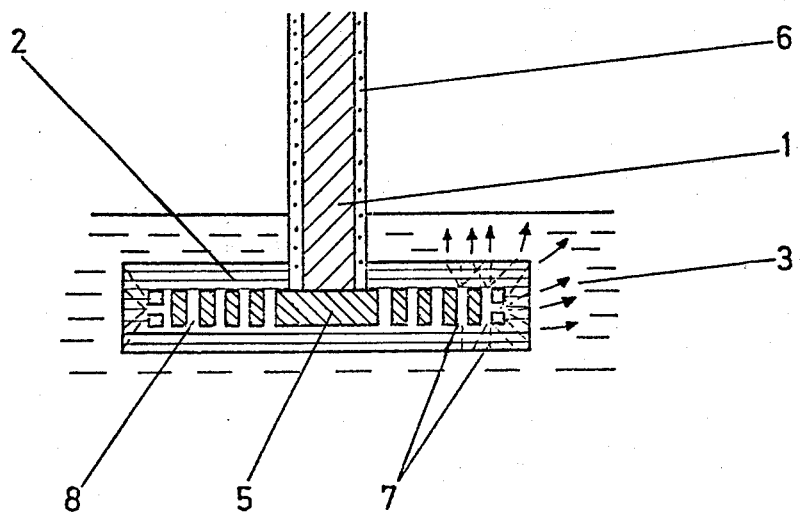

FIG. 2 An anode with a porous structure over the whole surface. Protection of the areas carrying no current is given by diverting the gas formed at the anode.

The anode shown in FIG. 1 used for the electrolysis of a molten charge, in particular Al$_2$O$_3$, is protected from attack by dissolved and suspended metal in those places where there is too low a current density by oxidising gas emerging from the porous sidewalls. The electrical conductor 1 is made of a metal or of another electron-conductive material such as a carbide, nitride or boride. The ceramic oxide part 2 of the anode is at least in part in contact with the molten electrolyte 3. The oxidising gas is fed through the channel 4 and then emerges uniformly through holes in the power distributing part 5 and pores 7 in the ceramic oxide of the side-walls and out through the anode surface. The current distributor 5 consists of a hollow body or a wire network in the center of the anode; it lowers the internal resistance of the anode and makes a uniform distribution of current easier. It is made of metal, for example nickel, copper, cobalt, molybdenum or one of their alloys, or out of a non-metallic material such as a carbide, nitride, boride or a mixture of these which is electron-conductive at the operating temperature. It is important that the power distributor leads the oxidising gas to the porous ceramic oxide at the surface of the anode and does not react either with the oxidising gas or with the ceramic oxide at the operating temperature. The electrical conductor 1 and the power distributor 5 can be made of the same material and if desired can be made as one piece.

FIG. 2 shows a completely immersed anode with which no external supply of protective oxidising gas is necessary. It is so designed that the anode gas can be led from areas with sufficient current density to those areas where the current density is less than the minimum value. The driving force for this is the hydrostatic pressure which is dependent on the depth of immersion. The electrical conductor 1 immersed in the molten electrolyte 3 is covered with a protective layer 6 which is made of a material which is a poor conductor and is resistant to attack by the electrolyte and for such a material might be taken for example boron nitride, electromelted aluminum oxide or magnesium oxide. The penetration of the electrolyte 3 into the pores 7 of the ceramic oxide 2 is prevented in the case of sufficiently small pore diameter by the high surface tension and the poor wetting of the melt. If, however, pores of larger diameter or channels are present then the melt would be able to enter them. Then, at least the passages 8 through the power distributor 5 must be coated with a layer of badly conducting and cryolite-melt-resistant material preferably of the same kind as in the protective layer 6.

In a version which is not shown here, a mixture of gases supplied from outside and gas formed at the anode, are led to the endangered areas. Thus anodes with dense, i.e., non-porous ceramic oxide surfaces can be protected from reduction in those areas with too low a current density by choosing the geometry and fitments of the cell such that the gas developed at the anode, and if desired, the oxidising gas supplied from outside, has to be diverted along the surface of the anode. By forming in the bottom face of the anode grooves which run from the center of the face to the perimeter, a uniformly distributed gas flow can be achieved.

In the following example the effect of the suggested measures is tested in that the effect of an oxygen film on a body of ceramic oxide material which has been immersed in a cryolite melt without carrying any current is investigated.

Tin oxide with the following properties was used as the base material in the manufacture of the sample:

| | |
|---|---|
| Purity: | 99.9% |
| True density: | 6.94 g/cm³ |
| Grain size: | <5 μm |

Manganese di-oxide was used as a sintering agent. At least 0.3 % $MnO_2$ is necessary for the production of a dense $SnO_2$ ceramic. Since however a sample which is at least partly porous is desired, only 0.1% $MnO_2$ was added to the base material and the components dry-ground in a mixer for 20 minutes. 250g of this mixture was poured into a cylindrical Vinamold mould and compressed by hand using an iron cylinder. The filled mould was placed in the pressure chamber of an isostatic press. The pressure was raised from 0 to 2000 kg/cm² in three minutes, held at maximum pressure for 10 seconds and then removed within a few seconds. The unsintered "green" sample was removed from the mold, polished and divided into single pieces of about 6 cm in length. These cylindrical pieces were then hollowed out along the cylinder axis to a depth of 5.5 cm using a drill 1 cm in diameter, so that the wall thickness at the front face was still about 0.5 cm.

The "green" samples were heated from room temperature to 1250°C over an interal of 18 hours in a furnace with molybdenum silicide heating rods. The samples were held at 1250°C for 5 hours and then cooled to 400°C during the following 24 hours. On reaching this temperature, the sintered samples were taken out of the furnace and after reaching room temperature they were weighed, measured and the density measured.

| | |
|---|---|
| Outer diameter: | 2.46 cm |
| Area of front face: | 4.75 cm² |
| Measured density: | 4.53 g/cm³ |
| % of theoretical density: | 65.3 |

The comparison of the measured and true densities shows that the sintered sample had a relatively high porosity.

A highly sintered aluminum oxide ring of approximately the same length was cemented onto the outer face of the sample such that the space between was sintered with a slurry of production-grade aluminum oxide so that one end of this protective ring was bonded to the full end face of the sample. This way the full front face of the porous tin oxide sample was freely accessable whilst the outer face was wholly or for the main part covered.

In the same way a highly sintered aluminum oxide tube was cemented in to the centrally bored hollow in the sample and was by preference such that it reached to the end of the hollow and also projected out of the sample.

The prepared sample was immersed to a depth of 2 cm in a cryolite melt of the following composition

| | |
|---|---|
| Cryolite | 1105 g = 85% |
| Reduction plant aluminum oxide | 130 g = 10% |
| $AlF_3$ | 65 g = 5% |

Under this melt there was 100 g of liquid aluminum which had been previously added in order to simulate as closely as possible the conditions of an industrial electrolytic cell which is saturated with aluminum.

This electrolyte melt was contained in a graphite crucible 11 cm in diameter and 11 cm deep. The depth of electrolyte was approximately 6 cm. The electrolyte was heated externally by four hotplates with a total output of 3.6 kW.

Immediately after immersing the sample in the electrolyte, without supplying electric current to it, a specific amount of oxygen was fed through the aluminum oxide tube cemented to the sample. Because of the dense outer aluminum oxide ring and the likewise dense cladding in the hollow, this oxygen is forced to pass through the porous structure of the bottom face of the sample and pass out uniformly into the cryolite melt. The bottom face of the sample is thereby covered with a film of oxygen which should prevent the reduction of the ceramic oxide.

After this test, the sample was removed from the melt and cooled. The length of the ceramic oxide sample was then measured with a sliding calipers and the specific amount of material removed by corrosion calculated in cm³ per hour.

TABLE I

| Test No. | Duration of test (h) | Oxygen-throughput ($\frac{mmol}{cm^2.h}$) | Corrosion of the bottom of the anode ($\frac{cm^3}{cm^2.h}$) |
|---|---|---|---|
| 1 | 42 | 0 | 0,0083 |
| 2 | 41 | 0,10 | 0,0014 |
| 3 | 42 | 0,25 | not measurable |
| 4 | 42 | 1,83 | not measurable |
| 5 | 41 | 11,2 | not measurable |

The table shows that the bottom of the sample corrodes markedly when there is no protection from the oxygen. A throughput of only 0.1 m mol/(cm.²h) noticeably reduces the amount removed by corrosion but a measurable amount is still removed. With througputs of 0.25 m mol/(cm².h) and more no attack on the bottom face of the sample can be either measured or observed.

It can be concluded from these results that the surface of the ceramic oxide is effectively protected from being reduced by suspended and dissolved aluminum due to the presence of an oxygen film which was produced without current.

What is claimed is:

1. In a process for operating a cell for the electrolysis of a molten charge containing aluminum oxide, the cell being of the type including at least one non-consumable anode comprising at least a section composed of a ceramic oxide material and defining a working surface, at least a portion of said working surface being in contact with said molten charge and having a certain current density distribution,
   at least a part of said portion of said working surface having a current density less than about 0.001 amps per square centimeter,
   the step comprising contacting said part with an oxidizing gas, whereby corrosion of said working surface is substantially inhibited.

2. The process as claimed in claim 1, further comprising the step of conducting the oxidizing gas from outside said anode to the interior of said anode and then to said part of said working surface.

3. The process as claimed in claim 1, wherein said anode produces an anode gas possessing oxidizing properties, further comprising using said anode gas for said oxidizing gas.

4. The process as claimed in claim 1, further comprising conducting said oxidizing gas from outside said molten charge into said molten charge to said part of said working surface.

5. The process as claimed in claim 1, wherein said oxidizing gas is selected from the group consisting of oxygen, air, chlorine, fluorine, carbon dioxide, nitrogen oxide, or mixtures thereof.

6. The process as claimed in claim 1, wherein said anode produces an anode gas possessing oxidizing properties, further comprising forming said oxidizing gas from a mixture of said anode gas and another gas supplied from outside said cell.

7. The process as claimed in claim 1, wherein said gas is supplied at the rate of about 0.01 m mol/cm$^2$.hr.

8. The process as claimed in claim 1, wherein said gas is supplied at the rate of 0.1 m mol/cm$^2$.hr.

9. The process as claimed in claim 1, wherein said gas is supplied at the rate of 0.2 m mol/cm$^2$.hr.

10. The process as claimed in claim 1, wherein said molten charge comprises an electrolyte based on cryolite.

* * * * *